United States Patent [19]
Ham

[11] Patent Number: 5,513,219
[45] Date of Patent: Apr. 30, 1996

[54] APPARATUS AND METHOD FOR TRANSMITTING INFORMATION WITH A SUBMINIMALLY MODULATED TRANSMISSION SIGNAL

[75] Inventor: Ronald E. Ham, 1908-R Kramer La., Austin, Tex. 78758

[73] Assignees: Compaq Computer Corporation; Ronald E. Ham

[21] Appl. No.: 296,721

[22] Filed: Aug. 26, 1994

[51] Int. Cl.[6] ............................. H04L 27/10; H04L 27/12; H04L 27/14
[52] U.S. Cl. ........................... 375/272; 375/303; 375/334; 329/300; 332/100; 455/44; 455/205
[58] Field of Search ..................................... 375/271, 272, 375/274, 278, 302, 303, 305, 322, 334, 335, 336; 332/117, 123, 124, 100; 329/300, 318, 315; 455/42, 44, 205, 214, 110, 112

[56] References Cited

U.S. PATENT DOCUMENTS

| | | | |
|---|---|---|---|
| 4,648,099 | 3/1987 | Kerr | 375/274 X |
| 5,187,721 | 2/1993 | Wong | 375/303 |
| 5,204,642 | 4/1993 | Ashgar | 332/100 |
| 5,309,480 | 5/1994 | Powell | 375/336 |
| 5,311,556 | 5/1994 | Baker | 375/334 |

*Primary Examiner*—Stephen Chin
*Assistant Examiner*—Tesfaldet Bocure
*Attorney, Agent, or Firm*—David G. Henry

[57] ABSTRACT

Applicant's invention includes an apparatus and associated method for transmitting information at a high rate using an undermodulated frequency shift keyed signal. The transmission rate is independent of the data content and the system requires no zero crossing detectors. The demodulator combines non-linear processing circuitry with a conventional demodulator.

40 Claims, 8 Drawing Sheets

APPARATUS AND METHOD FOR TRANSMITTING INFORMATION WITH A SUBMINIMALLY MODULATED TRANSMISSION SIGNAL

BACKGROUND OF THE INVENTION

1. Field of the Invention

Applicant's invention relates to the high speed transmission of electrical information over a bandwidth limited media.

2. Background Information

Rapid information transmission is achieved by using a signal that changes rapidly with time. Because all real electrical systems contain stored energy however, a change in the signal cannot be accomplished without a corresponding change in the stored energy of the system. A definite amount of time is required to change the stored energy of any real system. Therefore, the system's ability to respond to a change in the signal is limited. If the rate at which the signal varies is arbitrarily increased, the system will eventually be unable to respond to the signal changes and the information will not be transmitted.

A signal's bandwidth is one measure of its speed. Similarly, the system's bandwidth represents its ability to respond to signal changes. Transmitting a large amount of information in a small amount of time requires wideband signals to represent the information and wideband systems to accommodate the signals. If the system's bandwidth is insufficient, it may be necessary to decrease signaling speed and thereby increase transmission time. Frequency modulation (FM) is a common technique used to communicate data over a bandwidth limited transmission channel. In FM systems, the changing values of the information signal are reflected in corresponding changes in the carrier signal's frequency. An FM demodulator must therefore determine the frequency of the carrier signal and translate the frequency back into a signal value. The design of conventional demodulators employing frequency locked loops, phase locked loops, and integrators driven by zero crossings detectors limit the signal bandwidth to a percentage of the carrier bandwidth. Conventional demodulators also tend to require several signal cycles to resolve a particular frequency. These constraints place limitations upon the data transmission rate, $f_d$, in addition to those imposed by the transmission media bandwidth.

One well known application for transmitting date using FM is referred to as Frequency Shift Keying (FSK). Data transmission by FSK assigns a specific carrier frequency to a particular data state. If there are two data states, i.e. one bit of date per state, then there are two frequencies used. If there are eight data states (three bits of data), then there are eight frequencies used. The most common implementation of FSK transmits one bit of data per data state, each state being represented by one of two frequencies. These frequencies are normally referred to as the "mark" frequency, $f_m$, and the "space" frequency, $f_s$.

Demodulation considerations generally dictate that the FSK signal modulation index, $I_{mod}$, be greater than or equal to 0.5 where $I_{mod}=f_{dev}/f_d$ and $f_{dev}$, the frequency deviation is the difference, in Hertz, between the mark frequency and the space frequency and $f_d$, the data rate in bits/second. This limitation on $I_{mod}$ exists primarily because frequency shifting results in a pair of uncorrelated $\sin(x)/x$ frequency spectra centered about each of the transmission frequencies.

Figure 1:
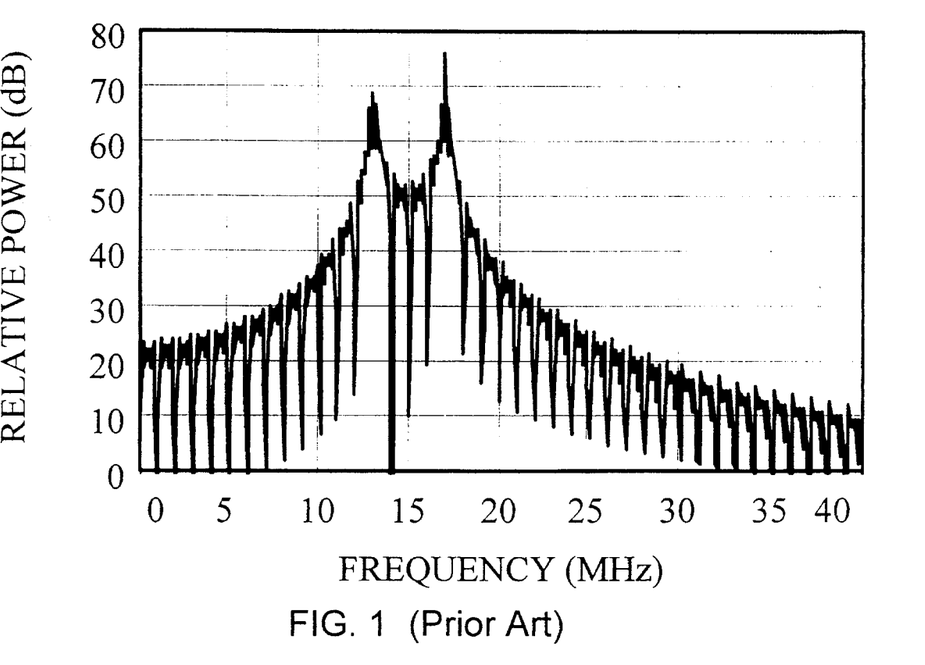
FIG. 1 is a frequency spectrum graph of a signal generated by phase continuous FSK with $f_m$=17 MHz, $f_s$=13 MHz, $f_{dev}$=2 MHZ and $f_d$=1 MHz.

A typical spectrum of a phase continuous toggled FSK signal is shown in FIG. 1 for a signal with a deviation of 4 MHz and a transmission rate of 1 Mbits/second. Matched demodulation filters must recognize the frequencies and the frequency separation enables each filter to resolve the power difference between a mark and a space.

Reduction of the modulation index to 0.5 produces Minimal Shift Keying (MSK). The frequencies used for MSK can be resolved in a linear system using matched filters. Referring back to FIG. 1, it can be seen that the two main power peaks are 2 MHz away from the center frequency. The shift rate of 1 MHz has produced side lobes on both of the major lobes that are 1 MHz away from the main lobes. As the data transmission rate, $f_d$, increases, the side lobes from the two main lobes move closer to the opposite main lobe. If the data rate exceeds the deviation, resolving the mark and space frequencies with a filter becomes difficult.

Phase continuous toggling between the two transmitted frequencies at a rate greater than the frequency difference between the mark and space frequencies, i.e. at $I_{mod}<0.5$, is Subminimal Shift Keying (SSK). The present invention represents the first synchronous application of grossly undermodulated phase continuous FM to transmit information. While systems have been suggested in which the instantaneous frequency of the carrier wave changes every half-cycle of the carrier waveform, the data rate of the present invention is independent of the data content, eliminating the need for FIFO buffers. Moreover, the present invention does not require that any fixed percentage of the signal cycle be modulated onto the carrier signal. In other words, the present invention is capable of retrieving information from a signal that changes instantaneous frequency more often than once per half cycle. Thus, higher data rates, as a percentage of the signal bandwidth, are achievable in the present device. Finally, the present invention does not rely upon zero crossing detectors for its timing. This eliminates the need for comparator circuits which are inherently prone to baseline wander and other small shifts in signal amplitude levels.

SSK modulation creates overlapping frequency spectra that precludes recovery in a linear system using matched filters. For example, switching between a space frequency of 13 MHz and a mark frequency of 17 MHz at a 12.5 MHz rate (i.e., every 40 nsec or, at 25 Mbps) results in the spectra shown in FIG. 2. The bandwidth is approximately $$BW=2f_d+f_{dev} \quad \text{(Eq. 1)}$$

Figure 2:
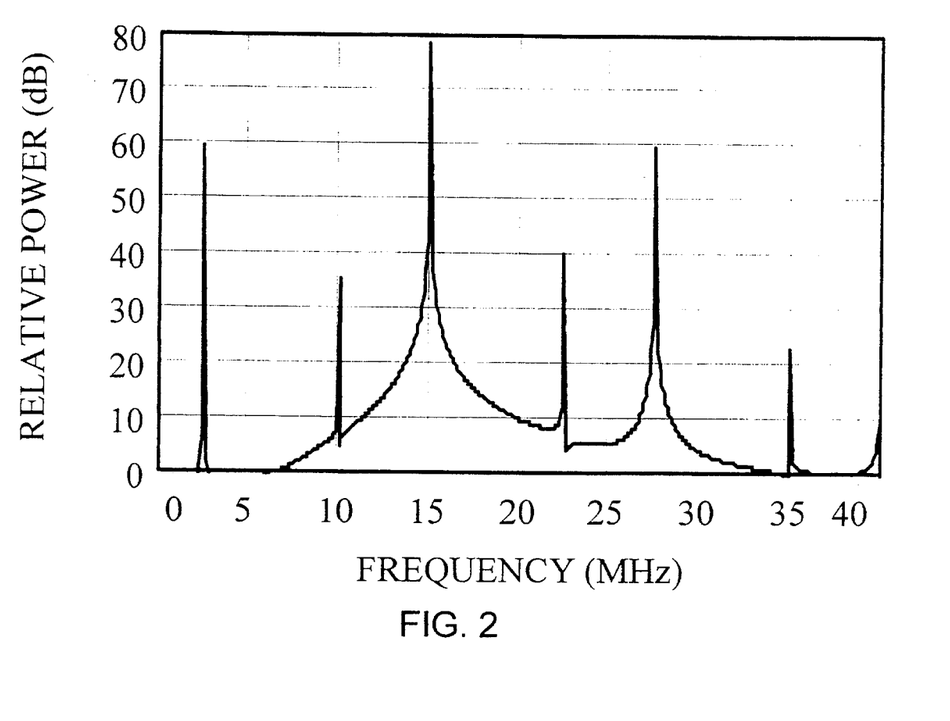
FIG. 2 is a frequency spectrum graph of a square wave modulated, phase continuous SSK signal with $f_m$=17 MHz, $f_s$=13 MHz, $f_{dev}$=2 MHZ, and $f_d$=12.5 MHz.
Figure 3:
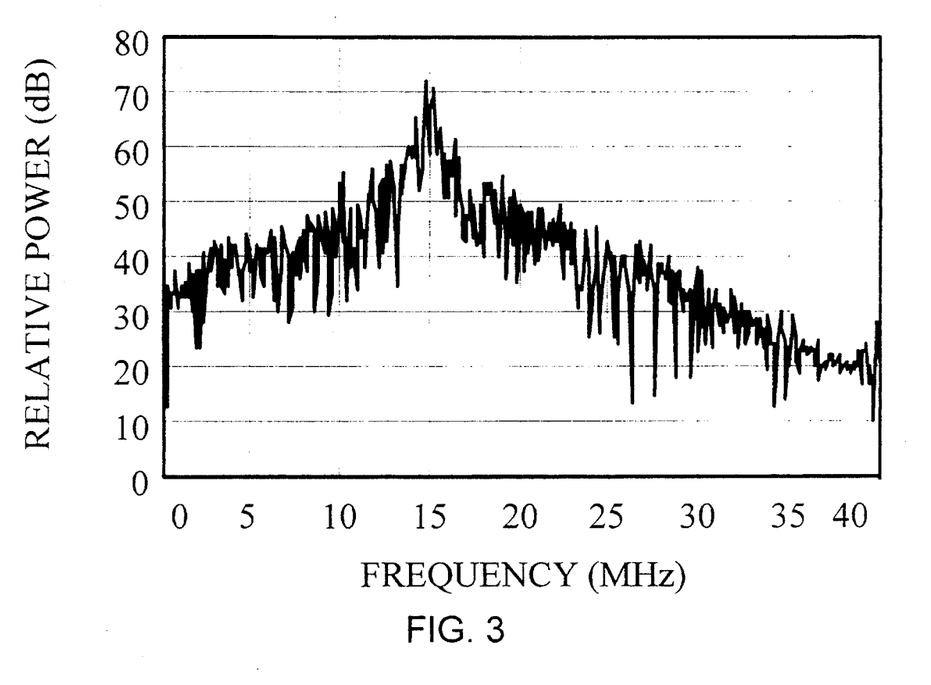
FIG. 3 is a frequency spectrum graph of a randomly modulated, phase continuous SSK signal with $f_m$=17 MHz, $f_s$=13 MHz, $f_{dev}$=2 MHZ, and $f_d$=12.5 MHz.

The center frequency of the spectra will be the arithmetic mean between the mark and space frequency, $f_c=(f_m+f_s)/2$ where $f_m$=the mark frequency and $f_s$=the space frequency. In the example, the center frequency is 15 MHz. Modulating the SSK generator with a random signal (i.e. true data) as shown in FIG. 3 yields a spectrum bounded by approximately the bandwidth predicted by Equation 1.

The method being suggested for recovery of the SSK data is to multiply the baseband frequency spectrum. Multiplication of the frequency spectrum of an FM signal multiplies the deviation frequency, $f_{dev}$, but does not multiply the limits of the spectrum established by the data rate, $f_d$, so that the multiplied spectrum bandwidth is $$BW_{mult}=2f_d+mf_{dev} \quad \text{(Eq. 2)}$$

where m=the order of the frequency multiplication. For example, doubling the frequency of the example spectrum three times results in a bandwidth of 41 MHz at a center frequency of $mf_c$ or 120 MHz. By increasing $f_{dev}$ while holding $f_d$ constant, the multiplication process improves $I_{mod}$ so that the multiplied signal can be demodulated in a conventional frequency discriminator.

Multiple frequencies can be used in an SSK system to represent multiple data states. The more frequencies used in the limited frequency shift region, the more times the signal will have to be multiplied to facilitate data recovery. An implementation of the preferred embodiment with a bit rate of 125 Mbps uses 5 bits per symbol (or $2^5=32$ distinct frequencies) and 3 voltage squaring circuits.

The frequency deviation and center are controlled by routing serial to parallel 10 outputs to appropriate inputs of phase accumulator 18. For example, to set the center frequency at 15 MHz with about +/−1.5 MHz of deviation on a system with N=5 and K=32 and system clock 24 operating at 75 MHz, delta phase symbol 12 must range from a value equivalent to 1.1310 radians to a value equivalent to 1.3823 radians. With N=5 and K=32, 27 inputs to phase accumulator 18 will remain static while the 5 remaining bits range from 00000 to 11111. The 27 static inputs to are set to obtain the initial value of 1.1310 and the 5 active lines are tied to the appropriate inputs such that as the 5 lines range from 00000 to 11111, phase symbol 12 will range from the initial value to a value equivalent to 1.3823.

Using a 125 Mbps bit rate divided by N=5 gives a data rate, $f_d$, of $12.5 \times 10^6$ symbols/sec. The frequency deviation, $f_{dev}$, of 3 MHz gives a $I_{mod}$ of approximately 0.12 for the transmitted signal. Upon passing through three voltage squaring circuits, $I_{mod}$ will be on the order of 0.96 which is more than sufficient to permit data recovery.

Although the preferred embodiment implements the SSK multi frequency oscillator with a direct digital synthesizer consisting of phase accumulator 18, look-up table ROM 20, and digital to analog converter 22, other configurations are possible. As long as the modulator has the capacity to generate a phase continuous signal with a modulation index significantly less than 0.5, specifics of the implementation are irrelevant. Similarly, the use of a voltage squarer circuit 44 in Demodulator 42 is merely a possible implementation. In a system employing a frequency shift in transmitter/conditioner 30, a conventional frequency doubler may be substituted for the voltage squarer circuit 44.

SUMMARY OF THE INVENTION

It is an object of the present invention to provide a novel and non-obvious FM system for transmitting information over a transmission media at rates greater than those achievable using conventional linear demodulators.

It is another object of the present invention to provide a novel and non-obvious system for transmitting information wherein the carrier signal has a modulation index of less than 0.5 enabling higher transmission rates over a media of fixed bandwidth.

It is another object of the present invention to provide a novel and non-obvious system for transmitting information with a phase continuous carrier signal that reduces the signal bandwidth and thus makes more efficient use of the frequency spectrum.

It is another object of the present invention to provide a system for transmitting information wherein the modulator and demodulator timing does not depend upon zero crossings, thus obviating the need for DC comparator circuitry to control the advancing of data.

It is another object of the present invention to provide a novel and non-obvious system for transmitting information in which the demodulator timing is independent of received signal amplitude and is thus immune from any wander of the signal that might occur.

It is another object of the present invention to provide a novel and non-obvious system for transmitting information wherein the carrier signal changes frequency at a constant rate obviating the need for FIFO buffers between the system and external devices.

It is another object of the present invention to provide a novel and non-obvious system for transmitting information wherein the portion of the signal cycle that is modulated onto the carrier signal is adjustable and can be less than one-half.

It is another object of the present invention to provide a novel and non-obvious method of transmitting information over a transmission media at rates greater than those achievable using conventional linear frequency demodulators.

It is another object of the present invention to provide a novel and non-obvious method of transmitting information wherein the carrier signal has a modulation index of less than 0.5 enabling higher transmission rates over a media of fixed bandwidth.

It is another object of the present invention to provide a novel and non-obvious method of transmitting information with a phase continuous carrier signal that reduces the signal bandwidth and thus uses the frequency spectrum more efficiently.

It is another object of the present invention to provide a method of transmitting information wherein the modulator and demodulator timing does not depend upon zero crossings, thus obviating the need for DC comparator circuitry to control the advancing of data.

It is another object of the present invention to provide a novel and non-obvious method of transmitting information in which the demodulator timing is independent of received signal amplitude and is thus immune from any wander of the signal that might occur.

It is another object of the present invention to provide a novel and non-obvious method of transmitting information wherein the carrier signal changes frequency at a constant rate obviating the need for FIFO buffers between the system and external devices.

It is another object of the present invention to provide a novel and non-obvious method of transmitting information wherein the portion of the signal cycle that is modulated onto the carrier signal is adjustable and can be less than one-half.

DETAILED DESCRIPTION OF THE PREFERRED EMBODIMENT

Figure 4:
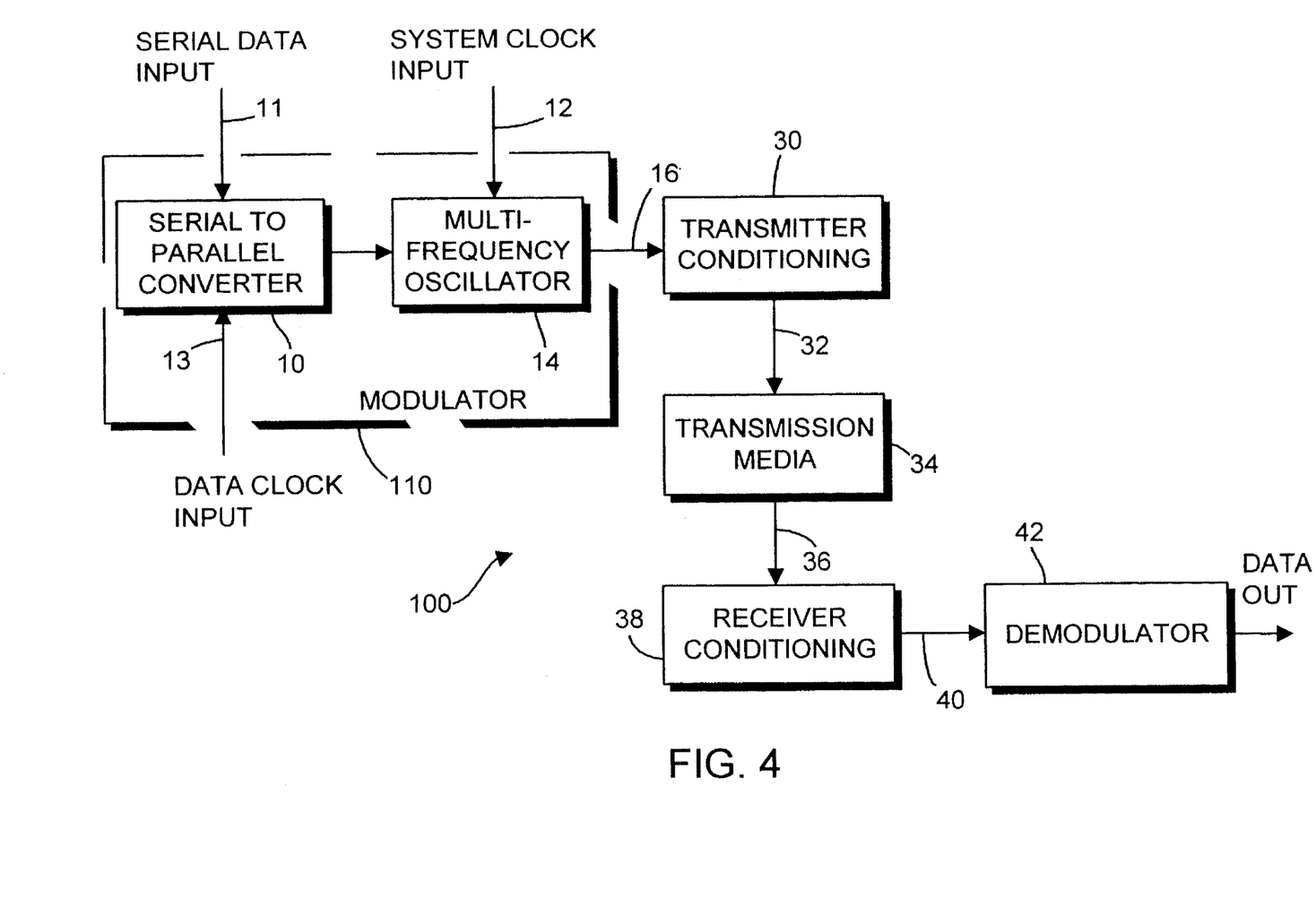
FIG. 4 is a block diagram of the preferred embodiment of the SSK communication system.
Figure 5:
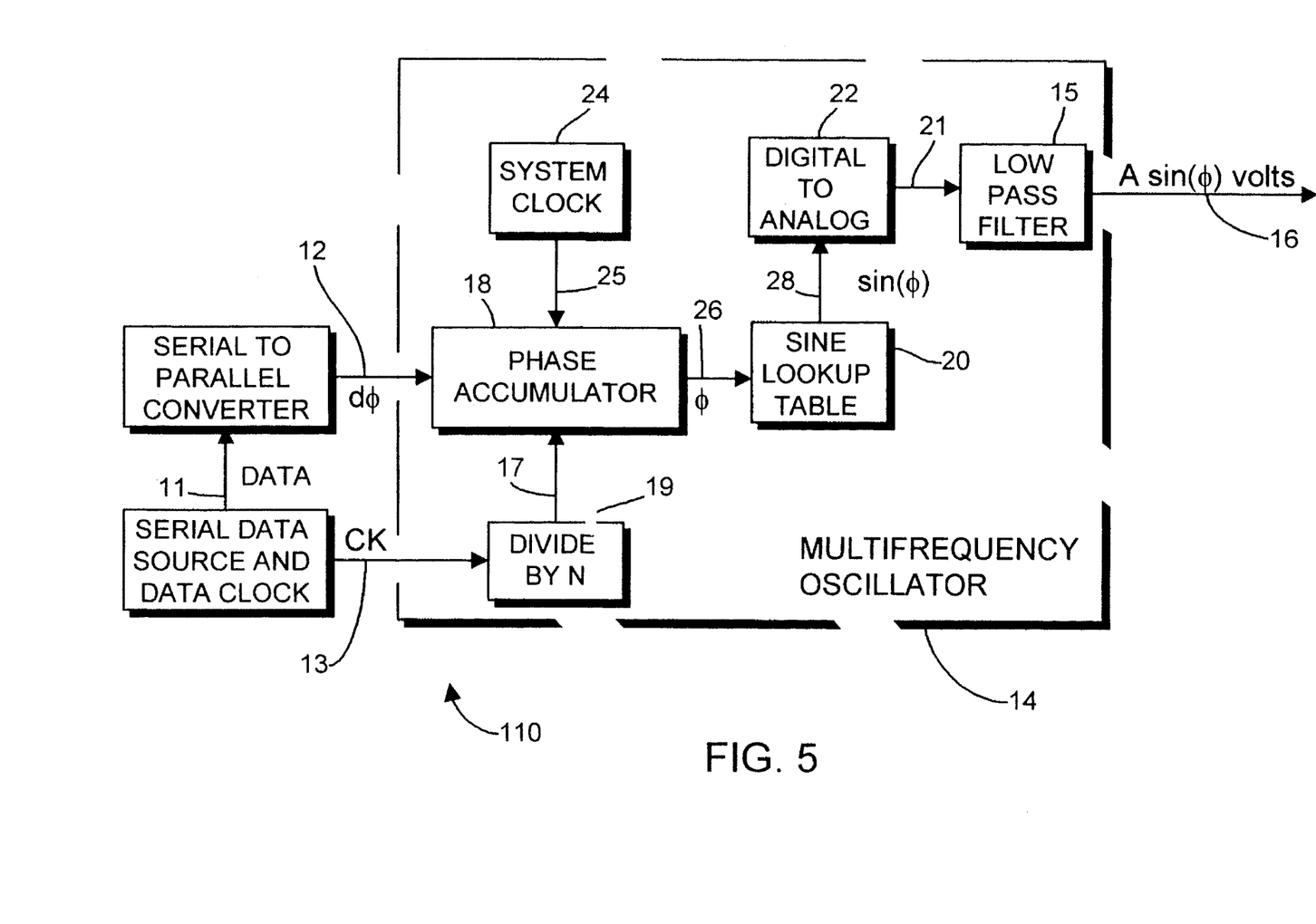
FIG. 5 is a block diagram of the preferred embodiment of the SSK modulator.

Referring to FIG. 4 depicting Communication System 100 and FIG. 5 depicting Modulator/Transmitter 110, Serial Data 11 is clocked into Serial-To-Parallel Converter 10 at a rate of $R_t$ bits/second by Data Clock 13. Data Clock 13 is also fed to Divide-By-N Circuit 19 to produce Phase Accumulator Data Clock 17. Every N cycles of Data Clock 13, Phase Accumulator Data Clock 17 makes a positive going transition at which time K-bit Symbol 12, the output of Serial-To-Parallel Converter 10, is clocked into the d$\phi$ register of Phase Accumulator 18. K-bit Symbol 12, and thus the value of the d$\phi$ register of Phase Accumulator 18, changes value every $T_0$ seconds where $T_0 = N/R_t$. The data rate, $f_d$, is the rate at which the K-bit Symbol 12 changes values. Thus, $f_d = 1/T_0 = R_t/N$.

K-bit Symbol 12 provides the input to Multi Frequency Oscillator (MFO) 14. MFO 14 generates MFO Output Signal 16. MFO Output Signal 16 is a sine wave whose frequency, $f_{MFO}$, is determined by the value of K-bit Symbol 12. Each unique state of K-bit Symbol 12 corresponds to a unique value of $f_{MFO}$. Thus, MFO Output Signal 16 can assume one of $2^K$ unique frequencies.

MFO 14 is comprised of Phase Accumulator 18, Look-Up Table 20, and Digital-To-Analog Converter (D/A) 22. Phase Accumulator 18 is comprised of a d$\phi$ register, a $\phi$ register, and means for incrementing the content of the $\phi$ register by the content of d$\phi$ register. A read only memory (ROM) is used as Look-Up Table 20 in the preferred embodiment. On every positive going edge of System Clock Signal 25, the content of the $\phi$ register of Phase Accumulator 18 is incremented by the content of the d$\phi$ register and routed to Sine Look-Up Table 20. If $\phi_n$ denotes the content of the $\phi$ register during the nth cycle of System Clock 24, then $\phi_{n+1} = \phi_n + d\phi$ where d$\phi$ is the content of the d$\phi$ register. If the contents of the $\phi$ register are thought of as a phase or an angle, then the angular frequency at any moment in time is equal to d$\phi$/dt where d$\phi$ represents the contents of the d$\phi$ register and dt=$1/f_{sys}$ where $f_{sys}$ is the frequency of System Clock 24 in Hertz. Because $f_{sys}$, and thus dt, are constant, d$\phi$/dt is solely dependent upon the content of the d$\phi$ register which, in turn, is determined by the value of K-bit Symbol 12. Therefore $f_{MFO}$, the instantaneous frequency of MFO Output Signal 16, is determined by K-bit Symbol 12. As the value of K-bit Symbol 12 changes, d$\phi$/dt changes and $f_{MFO}$ changes with it.

Symbol 26, the output of Phase Accumulator 18, is an L-bit digital representation of the phase, $\phi$. The L bits of Symbol 26 are routed to the address lines of Look-Up Table 20. Symbol 28, the output from look up table 20, is an M-bit digital representation of sin($\phi$). Symbol 28, sin($\phi$), is routed to D/A 22 which outputs Analog Signal 21 as an analog equivalent voltage of symbol 28. In other words, Analog Signal 21 has a voltage of A.sin($\phi$) where A is a constant. Analog Signal 21 is passed through Low Pass Filter (LPF) 15 to smooth out the small transitions made between the discrete values output from D/A 22. The output of LPF 15 is the MFO Output Signal 16.

Because $\phi_{n+1}$, the value of $\phi$ during cycle n+1, is expressed as the sum of the previous phase value, $\phi_n$, and a tiny incremental phase, d$\phi$, phase continuity is always maintained. Moreover, the delay time from a change in K-bit Symbol 12 to a change in $f_{MFO}$ is less than or equal to one period of System Clock 24 and is therefore negligible. Using MFO 14, $f_{MFO}$ is capable of changing rapidly. If the data rate $f_d$ is greater than the highest value of $f_{MFO}$, then MFO Output Signal 16 will change instantaneous frequency more often than once per period. In other words, it is not necessary for the MFO Output Signal 16 to complete a full cycle at one frequency before switching to a different frequency.

MFO Output Signal 16 is conditioned for transmission in Transmission Conditioner 30 using conventional signal conditioning techniques such as amplification, filtration, impedance transformation, and frequency translation to produce Conditioned Signal 32. Depending upon the requirements of Transmission Media 34, all or part of Transmitter Conditioner 30 may be optional. Where required by Transmission Media 34, Transmitter Conditioner 30 utilizes conventional frequency shifting, power amplification, filtering and coupling techniques to convert MFO Output Signal 16 into a form compatible for transmission through Transmission Media 34. Transmission Conditioner 30 then transmits Conditioned Signal 32 over Transmission Media 34.

The transmission of Conditioned Signal 32 over Transmission Media 34 cannot be accomplished without some resulting degradation in the quality of the transmitted signal. To reverse the effects of this degradation, Received Signal 36 is passed through Receiver Conditioner 38, which compensates for transmission path attenuation and dispersion using conventional signal compensation and restoration techniques, to produce Modulator Input Signal 40, which has the same frequency deviation, $f_{dev}$, and data rate, $f_d$, as MFO Output Signal 16. If Transmitter Conditioner 30 performs a frequency translation of MFO Output Signal 16, then Receiver Conditioner 38 performs a corresponding frequency shift of Received Signal 36. Modulator Input Signal 40 is then routed to Demodulator 42.

Figure 6:
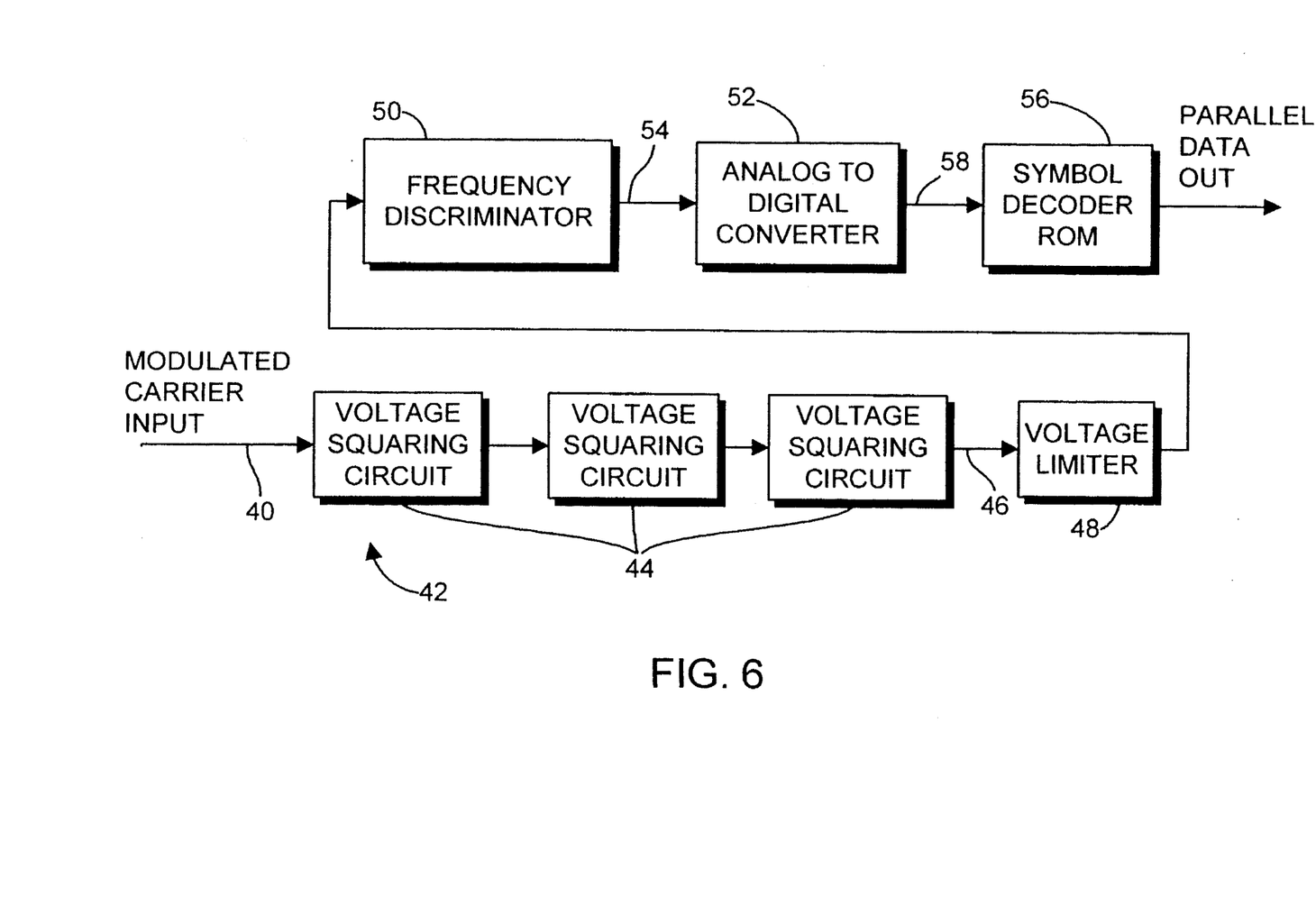
FIG. 6 is a block diagram of the preferred embodiment of the SSK demodulator.
Figure 7:
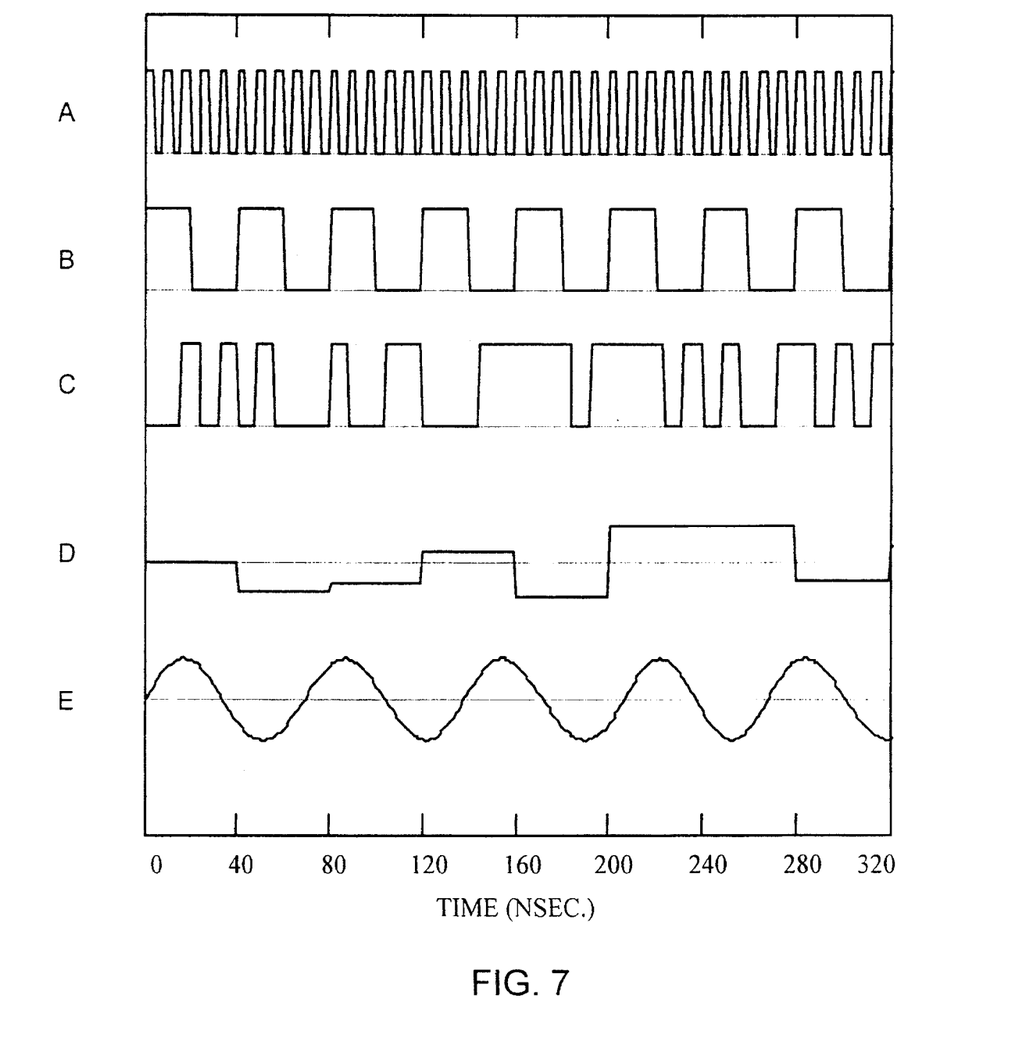
FIG. 7 is a timing diagram of various modulator signals illustrating the operation of the modulator.
Figure 8:
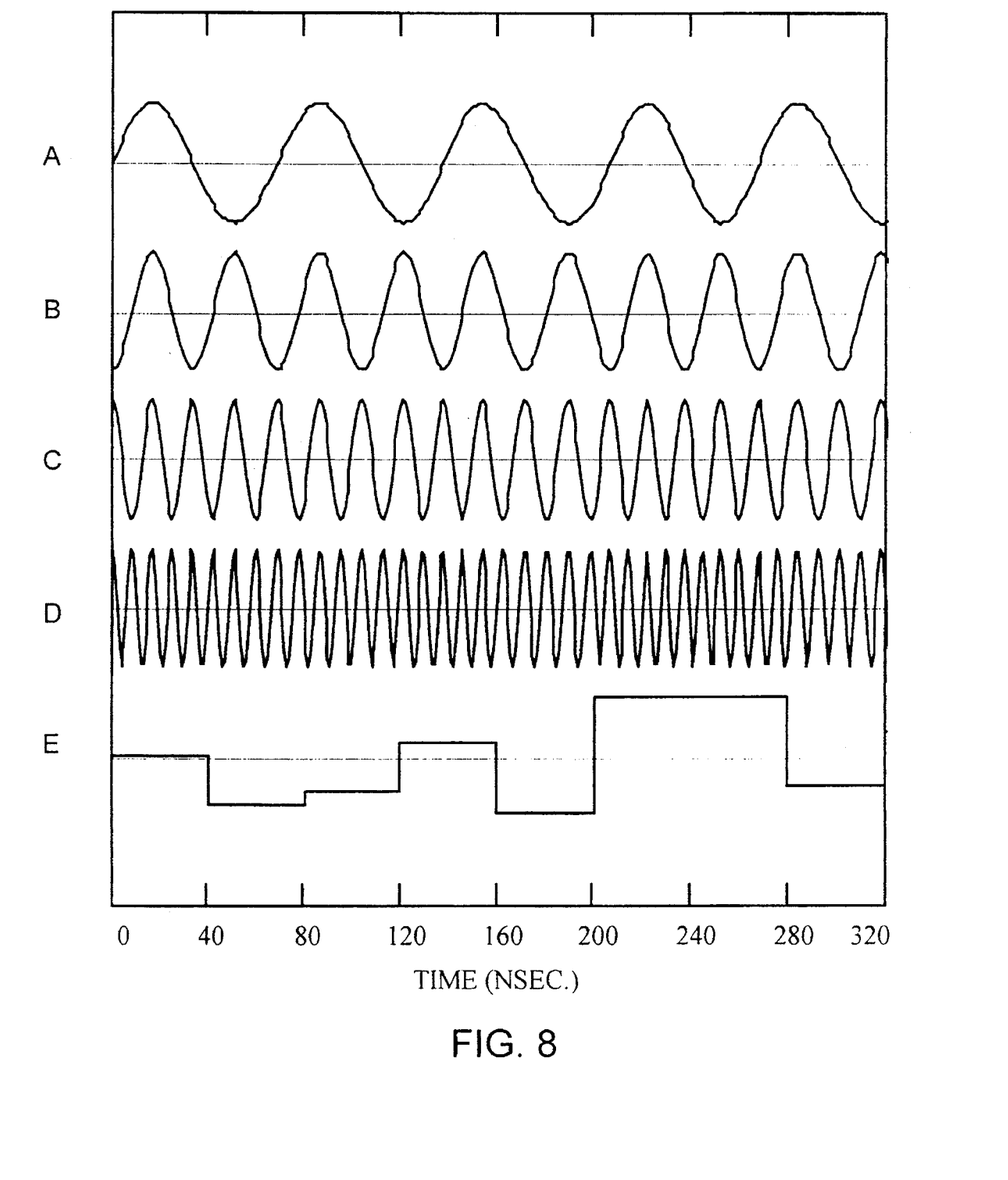
FIG. 8 is a timing diagram of various demodulator signals illustrating the operation of the demodulator.

Demodulator 42 comprises a plurality of Voltage Squaring Circuits 44, Voltage Limiter 48, Frequency Discriminator 50, Analog-To-Digital Converter (A/D) 52, and Symbol Decoder ROM 56. Modulator Input Signal 40 is routed to a series of Voltage Squaring Circuits 44. Because $$\sin^2(wt+\Theta) = \tfrac{1}{2} * [1 - \cos(2wt + 2\Theta)],$$

where w=$2\pi f$, each Voltage Squaring Circuit 44 doubles the instantaneous frequency of the received signal. Voltage Squaring Circuit 44 can be implemented using a Motorola MC1496 or similar device. For a discussion of the use of cross-coupled differential pairs as mixers/multipliers, see C. P. Abbott, R. E. Ham, S. W. Marshall, and L. D. Wickwar, *Design and Evaluation of a Monolithic Integrated Circuit Doubly Balanced Mixer/Modulator,* delivered by R.E. Ham at the National Aerospace Electronics Conference, Dayton, Ohio, 1968. Multiplied Signal 46 thus has an instantaneous frequency $2^Q$ times the instantaneous frequency of Modulator Input Signal 40 where Q equals the number of Voltage Squaring Circuits 44 used. For the embodiment shown in FIG. 6, three (3) Voltage Squaring Circuits 44 are used to produce a Multiplied Signal 46 with an instantaneous frequency 8 times that of the of Modulator Input Signal 40.

In addition to multiplying the instantaneous frequency of Modulator Input Signal 40, the Voltage Squaring Circuits 44 also multiply the frequency deviation, $f_{dev}$, of Modulator Input Signal 40 but do not affect its data rate, $f_d$. In other words, the modulation index, $f_{dev}/f_d$ is effectively doubled through each Voltage Squaring Circuit 44. By passing Modulator Input Signal 40 through a series of Voltage Squaring Circuits 44, the modulation index, $I_{MOD}$, of Multiplied Signal 46 is $2^Q$ times the $I_{MOD}$ of Modulator Input Signal 40. If enough Voltage Squaring Circuits 44 are used, the $I_{MOD}$ of Multiplied Signal 46 will be greater than 0.5 and thus capable of being demodulated in a conventional demodulation scheme.

Multiplied Signal 46 is passed through a conventional demodulator comprising Voltage Limiter 48 and Frequency Discriminator 50 to produce Analog Signal 54. Analog Signal 54 is routed to Analog-To-Digital Converter 52 which produces Digital Symbol 58. Digital Symbol 58 is routed to the address inputs of Symbol Decoder ROM 56 which generates Parallel Data Out 62. Parallel Data Out 62 contains the same information as K-bit Symbol 12 and thus the data has been modulated, transmitted, and recovered.

I claim:

1. Communication system apparatus capable of transmitting information via a frequency modulated signal over a transmission media with bandwidth $\geq f_{dev}+2 * f_d$ at transmission rates not achievable using conventional demodulators comprising:

subminimal modulation means capable of generating a phase continuous carrier signal with a modulation index less than 0.5 and wherein the timing of said means is independent of zero crossings or other DC levels of said modulated signal and wherein said means processes data at a constant rate independent of the data content;

FM signal processing and transmission means connected to said modulation means, wherein the carrier signal is transmitted over a transmission media;

FM signal receiving and processing means, configured to receive the carrier wave;

nonlinear signal processing means, connected to said signal receiving and processing means, wherein the modulation index of the carrier signal is increased;

a linear frequency demodulator serially connected to the output of said nonlinear signal processing means;

an analog to digital converter serially connected to the output of said linear frequency demodulator; and a symbol decoder serially connected to the output lines of said analog to digital converter.

2. The apparatus of claim 1 wherein said nonlinear signal processing means comprises a frequency multiplication circuit.

3. The apparatus of claim 2 wherein said frequency multiplication circuit comprises one or more voltage squaring circuits.

4. The apparatus of claim 3 wherein said voltage squaring circuits is implemented with a Motorola MC1496 or equivalent integrated circuit.

5. The apparatus of claim 1 wherein said subminimal modulation means receives externally supplied serial digital data which controls the frequency of said carrier signal.

6. The apparatus of claim 5 wherein said subminimal modulation means comprises;

an externally supplied data clock;

a serial-to-parallel converter, clocked by said data clock, wherein N bits of externally supplied serial data are converted into a symbol of K parallel bits;

a multi-frequency oscillator, connected to the output of said serial-to-parallel converter, wherein the oscillation frequency is controlled by said K-bit symbol.

7. The apparatus of claim 6 wherein said multi-frequency oscillator comprises, a high speed system clock;

a divide-by-N circuit supplied by said data clock wherein a clock signal of period N times the period of said data clock is generated;

an accumulator connected to the output of said serial-to-parallel converter and controlled by said system clock such that said K-bit symbol is latched into a first register within said accumulator on positive going transitions of said divide-by-N data clock signal and wherein said accumulator increments the value of an output register by the value of the first register on every positive going transition of said system clock;

a look-up table read only memory (ROM), with its address lines connected to the output register of said accumulator, manufactured or programmed so that the contents of said ROM at any address "x" are equal to sin(x);

a digital to analog converter with its inputs connected to the outputs of said look-up table ROM;

a low pass filter connected to the output of said digital to analog converter.

8. The apparatus of claim 7 wherein;

said high speed system clock operates at a frequency of approximately 75 MHz;

said externally supplied serial data is fed at a rate of approximately 125 Mbits/sec;

N is approximately equal to 5;

K is approximately equal to 32;

the output register of said accumulator is a word of approximately 24 bits;

the output of said ROM is a word of approximately 10 bits.

9. The apparatus of claim 2 wherein said subminimal modulation means receives externally supplied serial digital data which controls the frequency of said carrier signal.

10. The apparatus of claim 9 wherein said subminimal modulation means comprises;

an externally supplied data clock;

a serial-to-parallel converter, clocked by said data clock, wherein N bits of externally supplied serial data are converted into a symbol of K parallel bits;

a multi-frequency oscillator, connected to the output of said serial-to-parallel converter, wherein the oscillation frequency is controlled by said K-bit symbol.

11. The apparatus of claim 10 wherein said multi-frequency oscillator comprises, a high speed system clock;

a divide-by-N circuit supplied by said data clock wherein a clock signal of period N times the period of said data clock is generated;

an accumulator connected to the output of said serial-to-parallel converter and controlled by said system clock such that said K-bit symbol is latched into a first register within said accumulator on positive going transitions of said divide-by-N data clock signal and wherein said accumulator increments the value of an output register by the value of the first register on every positive going transition of said system clock;

a look-up table read only memory (ROM), with its address lines connected to the output register of said accumulator, manufactured or programmed so that the contents of said ROM at any address "x" are equal to sin(x);

a digital to analog converter with its inputs connected to the outputs of said look-up table ROM;

a low pass filter connected to the output of said digital to analog converter.

12. The apparatus of claim 11 wherein;

said high speed system clock operates at a frequency of approximately 75 MHz;

said externally supplied serial data is fed at a rate of approximately 125 Mbits/sec;

N is approximately equal to 5;

K is approximately equal to 32;

the output register of said accumulator is a word of approximately 24 bits;

the output of said ROM is a word of approximately 10 bits.

13. The apparatus of claim 3 wherein said subminimal modulation means receives externally supplied serial digital data which controls the frequency of said carrier signal.

14. The apparatus of claim 13 wherein said subminimal modulation means comprises;

an externally supplied data clock;

a serial-to-parallel converter, clocked by said data clock, wherein N bits of externally supplied serial data are converted into a symbol of K parallel bits;

a multi-frequency oscillator, connected to the output of said serial-to-parallel converter, wherein the oscillation frequency is controlled by said K-bit symbol.

15. The apparatus of claim 14 wherein said multi-frequency oscillator comprises, a high speed system clock;

a divide-by-N circuit supplied by said data clock wherein a clock signal of period N times the period of said data clock is generated;

an accumulator connected to the output of said serial-to-parallel converter and controlled by said system clock such that said K-bit symbol is latched into a first register within said accumulator on positive going transitions of said divide-by-N data clock signal and wherein said accumulator increments the value of an output register by the value of the first register on every positive going transition of said system clock;

a look-up table read only memory (ROM), with its address lines connected to the output register of said accumulator, manufactured or programmed so that the contents of said ROM at any address "x" are equal to sin(x);

a digital to analog converter with its inputs connected to the outputs of said look-up table ROM;

a low pass filter connected to the output of said digital to analog converter;

16. The apparatus of claim 15 wherein;

said high speed system clock operates at a frequency of approximately 75 MHz;

said externally supplied serial data is fed at a rate of approximately 125 Mbits/sec;

N is approximately equal to 5;

K is approximately equal to 32;

the output register of said accumulator is a word of approximately 24 bits;

the output of said ROM is a word of approximately 10 bits.

17. The apparatus of claim 4 wherein said subminimal modulation means receives externally supplied serial digital data which controls the frequency of said carrier signal.

18. The apparatus of claim 17 wherein said subminimal modulation means comprises;

an externally supplied data clock;

a serial-to-parallel converter, clocked by said data clock, wherein N bits of externally supplied serial data are converted into a symbol of K parallel bits;

a multi-frequency oscillator, connected to the output of said serial-to-parallel converter, wherein the oscillation frequency is controlled by said K-bit symbol.

19. The apparatus of claim 18 wherein said multi-frequency oscillator comprises, a high speed system clock;

a divide-by-N circuit supplied by said data clock wherein a clock signal of period N times the period of said data clock is generated;

an accumulator connected to the output of said serial-to-parallel converter and controlled by said system clock such that said K-bit symbol is latched into a first register within said accumulator on positive going transitions of said divide-by-N data clock signal and wherein said accumulator increments the value of an output register by the value of the first register on every positive going transition of said system clock;

a look-up table read only memory (ROM), with its address lines connected to the output register of said accumulator, manufactured or programmed so that the contents of said ROM at any address "x" are equal to sin(x);

a digital to analog converter with its inputs connected to the outputs of said look-up table ROM;

a low pass filter connected to the output of said digital to analog converter.

20. The apparatus of claim 19 wherein;

said high speed system clock operates at a frequency of approximately 75 MHz;

said externally supplied serial data is fed at a rate of approximately 125 Mbits/sec;

N is approximately equal to 5;

K is approximately equal to 32;

the output register of said accumulator is a word of approximately 24 bits;

the output of said ROM is a word of approximately 10 bits;

21. A method of transmitting information over a media with bandwidth limited to $f_{dev}+2 * f_d$ via a frequency modulated signal at a higher rate than is achievable using a linear demodulator comprising the steps of:

selecting a communication system comprising:

subminimal modulation means capable of generating a phase continuous carrier signal with a modulation index less than 0.5 and wherein the timing of said means is independent of zero crossings or other DC levels of said modulated signal and wherein said means processes data at a constant rate independent of the data content;

FM signal processing and transmission means connected to said modulation means, wherein the carrier signal is transmitted over a transmission media;

FM signal receiving and processing means, configured to receive the carrier wave;

nonlinear signal processing means, connected to said signal receiving and processing means, wherein the modulation index of the carrier signal is increased;

a frequency demodulator serially connected to the output of said nonlinear signal processing means;

an analog to digital converter serially connected to the output of said linear frequency demodulator; and a symbol decoder serially connected to the output lines of said analog to digital converter;

generating a phase continuous carrier signal with a with a modulation index less than 0.5 and wherein the timing of said modulation means is independent of zero crossings or other DC levels of said modulated signal and wherein said means processes data at a constant rate independent of the data content;

processing and transmitting said carrier signal over a transmission media with said processing and transmitting means;

receiving and processing said transmitted signal over a transmission media;

increasing the modulation index of said received signal with said nonlinear signal processing means;

demodulating said the output signal of said nonlinear processing means with said frequency demodulator;

converting the analog output of said frequency demodulator to a digital symbol with said analog to digital converter; and recovering the original data from said digital word with said symbol decoder.

22. The method of claim 21 wherein said nonlinear signal processing means comprises a frequency multiplication circuit.

23. The method of claim 22 wherein said frequency multiplication circuit comprises one or more voltage squaring circuits.

24. The method of claim 23 wherein said voltage squaring circuits is implemented with a Motorola MC1496 or equivalent integrated circuit.

25. The method of claim 21 wherein said subminimal modulation means receives externally supplied serial digital data which controls the frequency of said carrier signal.

26. The method of claim 25 wherein said subminimal modulation means comprises;

an externally supplied data clock;

a serial-to-parallel converter, clocked by said data clock, wherein N bits of externally supplied serial data are converted into a symbol of K parallel bits;

a multi-frequency oscillator, connected to the output of said serial-to-parallel converter, wherein the oscillation frequency is controlled by said K-bit symbol.

27. The method of claim 26 wherein said multi-frequency oscillator comprises, a high speed system clock;

a divide-by-N circuit supplied by said data clock wherein a clock signal of period N times the period of said data clock is generated;

an accumulator connected to the output of said serial-to-parallel converter and controlled by said system clock such that said K-bit symbol is latched into a first register within said accumulator on positive going transitions of said divide-by-N data clock signal and wherein said accumulator increments the value of an output register by the value of the first register on every positive going transition of said system clock;

a look-up table read only memory (ROM), with its address lines connected to the output register of said accumulator, manufactured or programmed so that the contents of said ROM at any address "x" are equal to sin(x);

a digital to analog converter with its inputs connected to the outputs of said look-up table ROM;

a low pass filter connected to the output of said digital to analog converter.

28. The method of claim 27 wherein;

said high speed system clock operates at a frequency of approximately 75 MHz;

said externally supplied serial data is fed at a rate of approximately 125 Mbits/sec;

N is approximately equal to 5;

K is approximately equal to 32;

the output register of said accumulator is a word of approximately 24 bits;

the output of said ROM is a word of approximately 10 bits.

29. The method of claim 22 wherein said subminimal modulation means receives externally supplied serial digital data which controls the frequency of said carrier signal.

30. The method of claim 29 wherein said subminimal modulation means comprises;

an externally supplied data clock;

a serial-to-parallel converter, clocked by said data clock, wherein N bits of externally supplied serial data are converted into a symbol of K parallel bits;

a multi-frequency oscillator, connected to the output of said serial-to-parallel converter, wherein the oscillation frequency is controlled by said K-bit symbol.

31. The method of claim 30 wherein said multi-frequency oscillator comprises, a high speed system clock;

a divide-by-N circuit supplied by said data clock wherein a clock signal of period N times the period of said data clock is generated;

an accumulator connected to the output of said serial-to-parallel converter and controlled by said system clock such that said K-bit symbol is latched into a first register within said accumulator on positive going transitions of said divide-by-N data clock signal and wherein said accumulator increments the value of an output register by the value of the first register on every positive going transition of said system clock;

a look-up table read only memory (ROM), with its address lines connected to the output register of said accumulator, manufactured or programmed so that the contents of said ROM at any address "x" are equal to sin(x);

a digital to analog converter with its inputs connected to the outputs of said look-up table ROM;

a low pass filter connected to the output of said digital to analog converter.

32. The method of claim 31 wherein;

said high speed system clock operates at a frequency of approximately 75 MHz;

said externally supplied serial data is fed at a rate of approximately 125 Mbits/sec;

N is approximately equal to 5;

K is approximately equal to 32;

the output register of said accumulator is a word of approximately 24 bits;

the output of said ROM is a word of approximately 10 bits.

33. The method of claim 23 wherein said subminimal modulation means receives externally supplied serial digital data which controls the frequency of said carrier signal.

34. The method of claim 33 wherein said subminimal modulation means comprises;

an externally supplied data clock;

a serial-to-parallel converter, clocked by said data clock, wherein N bits of externally supplied serial data are converted into a symbol of K parallel bits;

a multi-frequency oscillator, connected to the output of said serial-to-parallel converter, wherein the oscillation frequency is controlled by said K-bit symbol.

35. The method of claim 34 wherein said multi-frequency oscillator comprises, a high speed system clock;

a divide-by-N circuit supplied by said data clock wherein a clock signal of period N times the period of said data clock is generated;

an accumulator connected to the output of said serial-to-parallel converter and controlled by said system clock such that said K-bit symbol is latched into a first register within said accumulator on positive going transitions of said divide-by-N data clock signal and wherein said accumulator increments the value of an output register by the value of the first register on every positive going transition of said system clock;

a look-up table read only memory (ROM), with its address lines connected to the output register of said accumulator, manufactured or programmed so that the contents of said ROM at any address "x" are equal to sin(x);

a digital to analog converter with its inputs connected to the outputs of said look-up table ROM;

a low pass filter connected to the output of said digital to analog converter.

36. The method of claim 35 wherein;

said high speed system clock operates at a frequency of approximately 75 MHz;

said externally supplied serial data is fed at a rate of approximately 125 Mbits/sec;

N is approximately equal to 5;

K is approximately equal to 32;

the output register of said accumulator is a word of approximately 24 bits;

the output of said ROM is a word of approximately 10 bits.

37. The method of claim 24 wherein said subminimal modulation means receives externally supplied serial digital data which controls the frequency of said carrier signal.

38. The method of claim 37 wherein said subminimal modulation means comprises;

an externally supplied data clock;

a serial-to-parallel converter, clocked by said data clock, wherein N bits of externally supplied serial data are converted into a symbol of K parallel bits;

a multi-frequency oscillator, connected to the output of said serial-to-parallel converter, wherein the oscillation frequency is controlled by said K-bit symbol.

39. The method of claim 38 wherein said multi-frequency oscillator comprises, a high speed system clock;

a divide-by-N circuit supplied by said data clock wherein a clock signal of period N times the period of said data clock is generated;

an accumulator connected to the output of said serial-to-parallel converter and controlled by said system clock such that said K-bit symbol is latched into a first register within said accumulator on positive going transitions of said divide-by-N data clock signal and wherein said accumulator increments the value of an output register by the value of the first register on every positive going transition of said system clock;

a look-up table read only memory (ROM), with its address lines connected to the output register of said accumulator, manufactured or programmed so that the contents of said ROM at any address "x" are equal to sin(x);

a digital to analog converter with its inputs connected to the outputs of said look-up table ROM;

a low pass filter connected to the output of said digital to analog converter.

40. The method of claim 39 wherein;

said high speed system clock operates at a frequency of approximately 75 MHz;

said externally supplied serial data is fed at a rate of approximately 125 Mbits/sec;

N is approximately equal to 5;

K is approximately equal to 32;

the output register of said accumulator is a word of approximately 24 bits;

the output of said ROM is a word of approximately 10 bits.

* * * * *